United States Patent
Lee et al.

(10) Patent No.: US 12,100,991 B2
(45) Date of Patent: Sep. 24, 2024

(54) DUAL-INPUT POWER SWITCHING SYSTEM AND METHOD OF OPERATING THE SAME

(71) Applicant: DELTA ELECTRONICS, INC., Taoyuan (TW)

(72) Inventors: Yuan-Fang Lee, Taoyuan (TW); Chang-Chih Chen, Taoyuan (TW); Chih-Chiang Chan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 2 days.

(21) Appl. No.: 17/885,821

(22) Filed: Aug. 11, 2022

(65) Prior Publication Data
US 2023/0402871 A1    Dec. 14, 2023

(30) Foreign Application Priority Data
Jun. 9, 2022    (CN) .................. 202210644659.5

(51) Int. Cl.
*H02J 9/06*    (2006.01)

(52) U.S. Cl.
CPC .............. *H02J 9/061* (2013.01); *H02J 9/068* (2020.01)

(58) Field of Classification Search
CPC .... H02J 9/00; H02J 9/061; H02J 9/068; H02J 7/345
See application file for complete search history.

(56) References Cited

U.S. PATENT DOCUMENTS

| | | | |
|---|---|---|---|
| 2012/0007433 A1 | 1/2012 | Wei et al. | |
| 2014/0159496 A1 | 6/2014 | Lee | |
| 2015/0109708 A1* | 4/2015 | Cheng | H02H 9/025 361/93.9 |
| 2015/0214742 A1 | 7/2015 | Yu et al. | |

(Continued)

FOREIGN PATENT DOCUMENTS

| | | |
|---|---|---|
| CN | 104811036 A | 7/2016 |
| CN | 114513042 A | 5/2022 |

(Continued)

OTHER PUBLICATIONS

An Office Action in corresponding TW Application No. 111121377 dated Feb. 3, 2023 is attached, 6 pages.

(Continued)

*Primary Examiner* — Rexford N Barnie
*Assistant Examiner* — Rasem Mourad
(74) *Attorney, Agent, or Firm* — MUNCY, GEISSLER, OLDS & LOWE, P.C.

(57) ABSTRACT

A dual-input power switching system includes a first DC power source, a second DC power source, a DC conversion circuit, and a boost-up circuit. The first DC power source provides a first DC voltage, and the second DC power source provides a second DC voltage. The DC conversion circuit receives the first DC voltage or the second DC voltage being an input voltage, and converts the input voltage to supply power to a load. The boost-up circuit provides a hold-up voltage to boost up the input voltage when the first DC power source stops supplying power to lead to power drop of the input voltage, such that the input voltage reaches to a specific voltage that is greater than the second DC voltage and afterward naturally decreases to be less than or equal to the second DC voltage.

19 Claims, 5 Drawing Sheets

(56) References Cited

U.S. PATENT DOCUMENTS

| | | | |
|---|---|---|---|
| 2019/0109486 A1* | 4/2019 | Chiu | H02J 9/061 |
| 2022/0158485 A1* | 5/2022 | Xu | H02M 1/4208 |
| 2022/0239115 A1* | 7/2022 | Zohar | H01H 9/548 |
| 2023/0333616 A1* | 10/2023 | Ramanjani | H02J 1/086 |

FOREIGN PATENT DOCUMENTS

| | | |
|---|---|---|
| TW | 374523 | 11/1999 |
| TW | 201203823 A | 1/2012 |
| TW | 201431244 A | 8/2014 |

OTHER PUBLICATIONS

Search Report dated Aug. 9, 2023 of the corresponding PCT patent application No. PCT/CN2023/095906.

* cited by examiner

DUAL-INPUT POWER SWITCHING SYSTEM AND METHOD OF OPERATING THE SAME

BACKGROUND

Technical Field

The present disclosure relates to a power switching system and method of operating the same, and more particularly to a dual-input direct-current power switching system and method of operating the same.

Description of Related Art

In the application of the dual-input power switching system, a power switch is used to switch one input power source (a first input power source) to another input power source (a second input power source), in order to continuously supply power to the load when a power outage or a power failure has encountered. However, if the first input power source is directly switched to the second input power source (for example, hard switching), a voltage difference between the two input power sources will generate a large current (also known as an inrush current) at the moment of switching. The inrush current may damage switching components at the input side of the power switching system. Alternatively, for a power protection mechanism of the input power source, the inrush current may cause an input current to exceed a maximum safety current to trigger the power supply protection mechanism, such that the input power source is automatically turned off. Moreover, in the power protection mechanism, since a magnitude of power is equal to a product of current and voltage (P=I*V), when the inrush current causes the input current to rise, the input power source may automatically reduce the input voltage to maintain the rated output power, which leads to insufficient capacity of the front-end power supply, and the entire system may shut down without warning.

Taking the application of dual-input AC (Alternating Current) power source as an example, by performing power switching when the AC power source is at zero voltage of phase shift, the inrush current caused by the voltage difference between the dual AC power sources may be avoided. However, in the application of dual-input DC (Direct Current) power source, the voltage difference between the dual DC power source will be unavoidable, and the generation of inrush current will be inevitable.

SUMMARY

An objective of the present disclosure is to provide a dual-input power switching system to solve the problems of existing technology.

In order to achieve the above-mentioned objective, the dual-input power switching system includes a first DC power source, a second DC power source, a DC conversion circuit, and a boost-up circuit. The first DC power source provides a first DC voltage. The second DC power source provides a second DC voltage. The DC conversion circuit is coupled to an output side of the second DC power source and an output side of the first DC power source, receives the first DC voltage or the second DC voltage being an input voltage, and converts the input voltage to supply power to a load. The boost-up circuit is coupled to an input side of the DC conversion circuit, the output side of the first DC power source, and the output side of the second DC power source, provides a hold-up voltage to boost up the input voltage when the first DC power source stops supplying power to lead to power drop of the input voltage, such that the input voltage reaches to a specific voltage that is greater than the second DC voltage and afterward naturally decreases to be less than or equal to the second DC voltage.

According to the disclosed power switching system, when the first DC power source stops supplying power to lead to power drop of the input voltage, the boost-up circuit is activated to provide the hold-up voltage to boost up the input voltage so as to keep the load 100 working under the power drop of the input voltage. Meanwhile, the boost-up circuit makes the hold-up voltage to reach to the specific voltage greater than the second DC voltage, which can avoid inrush current generated by the voltage difference between the first DC voltage and the second DC voltage, thereby protecting the dual-input power switching system. Moreover, after the boost-up circuit is deactivated, the input voltage naturally drops from the higher specific voltage to the lower second DC voltage, and no inrush current is generated during the natural drop of the input voltage.

Another objective of the present disclosure is to provide a method of operating the dual-input power switching system to solve the problems of existing technology.

In order to achieve the above-mentioned objective, the method of operating the dual-input power switching system includes steps of: (a) providing a first DC voltage being an input voltage from a first DC power source, and converting the input voltage to supply power to a load, (b) determining whether power drop of the input voltage occurs, (c) activating a boost-up circuit when the power drop of the input voltage occurs to gradually increase a hold-up voltage being the input voltage, (d) determining whether the input voltage has reached to a specific voltage, and (e) switching a second DC voltage provided from a second DC power source to be the input voltage until the input voltage has reached to the specific voltage for a specific time period.

According to the method of operating the dual-input power switching system, when the first DC power source stops supplying power to lead to power drop of the input voltage, the boost-up circuit is activated to provide the hold-up voltage to boost up the input voltage so as to keep the load 100 working under the power drop of the input voltage. Meanwhile, the boost-up circuit makes the hold-up voltage to reach to the specific voltage greater than the second DC voltage, which can avoid inrush current generated by the voltage difference between the first DC voltage and the second DC voltage, thereby protecting the dual-input power switching system. Moreover, after the boost-up circuit is deactivated, the input voltage naturally drops from the higher specific voltage to the lower second DC voltage, and no inrush current is generated during the natural drop of the input voltage.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
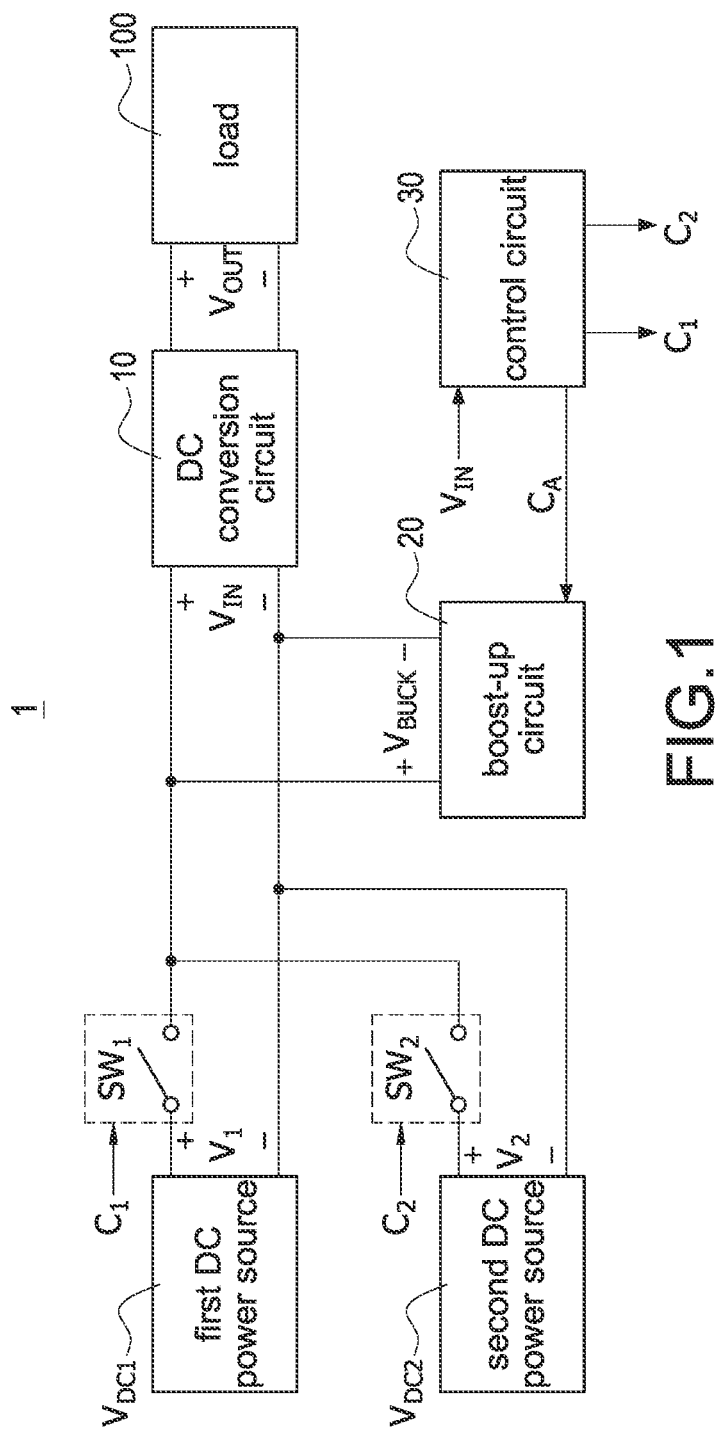
FIG. 1 is a block diagram of a dual-input power switching system according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of a dual-input power switching system 1 according to a first embodiment of the present disclosure. The dual-input power switching system 1 is applicable for dual DC input, especially using a first switch $SW_1$ and a second switch $SW_2$ to switch a first DC power source $V_{DC1}$ to a second DC power source $V_{DC2}$ so as to uninterruptedly supply power to the load 100 due to power outage or power failure. One of the first DC power source $V_{DC1}$ and the second DC power source $V_{DC2}$ may be a backup power.

The dual-input power switching system 1 includes the first DC power source $V_{DC1}$, the second DC power source $V_{DC2}$, a first switch $SW_1$, a second switch $SW_2$, a DC conversion circuit 10, a boost-up circuit 20, and a control circuit 30. The first DC power source $V_{DC1}$ provides a first DC voltage $V_1$, and the second DC power source $V_{DC2}$ provides a second DC voltage $V_2$. An input side of the DC conversion circuit 10 is coupled to the first DC power source $V_{DC1}$ and the second DC power source $V_{DC2}$, and receives the first DC voltage $V_1$ or the second DC voltage $V_2$ being an input voltage $V_{IN}$ of the DC conversion circuit 10. The DC conversion circuit 10 converts the first DC voltage $V_1$ or the second DC voltage $V_2$ into an output voltage $V_{OUT}$ to supply power to the load 100 so as to keep the load 100 working.

The first switch $SW_1$ is coupled between an output side of the first DC power source $V_{DC1}$ and the input side of the DC conversion circuit 10. When the first switch $SW_1$ is turned on, the first DC voltage $V_1$ is provided to the DC conversion circuit 10 to be the input voltage $V_{IN}$. The second switch $SW_2$ is coupled between an output side of the second DC power source $V_{DC2}$ and the input side of the DC conversion circuit 10. When the second switch $SW_2$ is turned on, the second DC voltage $V_2$ is provided to the DC conversion circuit 10 to be the input voltage $V_{IN}$.

The first DC power source $V_{DC1}$ is coupled to the input side of the DC conversion circuit through the first switch $SW_1$, and the second DC power source $V_{DC2}$ is coupled to the input side of the DC conversion circuit 10 through the second switch $SW_2$. When the first switch $SW_1$ is turned on, the first DC voltage $V_1$ is provided to the DC conversion circuit 10; or when the second switch $SW_2$ is turned on, the second DC voltage $V_2$ is provided to the DC conversion circuit 10. Therefore, the first switch $SW_1$ and the second switch $SW_2$ play the role of switching the first DC power source $V_{DC1}$ and the second DC power source $V_{DC2}$. In one embodiment, the first switch $SW_1$ and the second switch $SW_2$ may be relays.

The boost-up circuit 20 is coupled to the input side of the DC conversion circuit 10, the output side of the first DC power source $V_{DC1}$, and the output side of the second DC power source $V_{DC2}$, provides the hold-up voltage $V_{BUCK}$ to boost up the input voltage $V_{IN}$ when the first DC power source $V_{DC1}$ stops supplying power to lead to power drop of the input voltage $V_{IN}$. From another point of view, the first DC power source $V_{DC1}$, the second DC power source $V_{DC2}$, the boost-up circuit 20, and the DC conversion circuit 10 are coupled in parallel, that is, positive and negative polarities of the first DC voltage $V_1$, positive and negative polarities of the second DC voltage $V_2$, and positive and negative polarities of the hold-up voltage $V_{BUCK}$ are respectively coupled to positive and negative terminals of the input side of the DC conversion circuit 10 (i.e., positive and negative polarities of the input voltage $V_{IN}$).

The control circuit 30 is coupled to the first switch $SW_1$, the second switch $SW_2$, the DC conversion circuit 10, and the boost-up circuit 20, and generates a first control signal $C_1$ to the first switch $SW_1$, generates a second control signal $C_2$ to the second switch $SW_2$, and generates a boost-up signal $C_A$ to the boost-up circuit 20 according to the input voltage $V_{IN}$ of the DC conversion circuit 10.

In operation, when the control circuit 30 detects that the first DC power source $V_{DC1}$ provides the first DC voltage $V_1$ being the input voltage $V_{IN}$, the control circuit 30 turns on the first switch $SW_1$ by the first control signal $C_1$. Alternatively, when the control circuit 30 detects that the second DC power source $V_{DC2}$ provides the second DC voltage $V_2$ being the input voltage $V_{IN}$, the control circuit 30 turns on the second switch $SW_2$ by the second control signal $C_2$. When the control circuit 30 detects that the first DC power source $V_{DC1}$ stops supplying power to lead to power drop of the input voltage $V_{IN}$, such as abnormal power failure or abnormal voltage caused by overvoltage, undervoltage, or phase loss, or a user replaces the power supply manually, the control circuit 30 activates the boost-up circuit 20 by the boost-up signal $C_A$. The boost-up circuit 20 increases the hold-up voltage $V_{BUCK}$ according to the boost-up signal $C_A$, and provides the hold-up voltage $V_{BUCK}$ to the DC conversion circuit 10 to boost up the input voltage $V_{IN}$. Until the hold-up voltage $V_{BUCK}$ has reached to a specific voltage that is greater than the second DC voltage $V_2$, the control circuit 30 deactivates the boost-up circuit 20 by the boost-up signal $C_A$, and turns off the first switch $SW_1$ by the first control signal $C_1$. Until the specific voltage has been maintained for a specific time period, the control circuit turns on the second switch $SW_2$ by the second control signal $C_2$, such that the second DC power source $V_{DC2}$ provides the second DC voltage $V_2$ being the input voltage $V_{IN}$ to supply power to the load 100.

As a result, when the first DC power source $V_{DC1}$ stops supplying power to lead to power drop of the input voltage $V_{IN}$, the boost-up circuit 20 provides the hold-up voltage $V_{BUCK}$ to boost up the input voltage $V_{IN}$ to keep the load 100 working. Meanwhile, the boost-up circuit makes the input voltage $V_{IN}$ (or the hold-up voltage $V_{BUCK}$) reach to the specific voltage greater than the second DC voltage $V_2$ and then naturally drops to be less than or equal to the second DC voltage $V_2$ so as to avoid inrush current generated by the voltage difference between the first DC voltage $V_1$ and the second DC voltage $V_2$, thereby protecting the dual-input power switching system 1.

Figure 2:
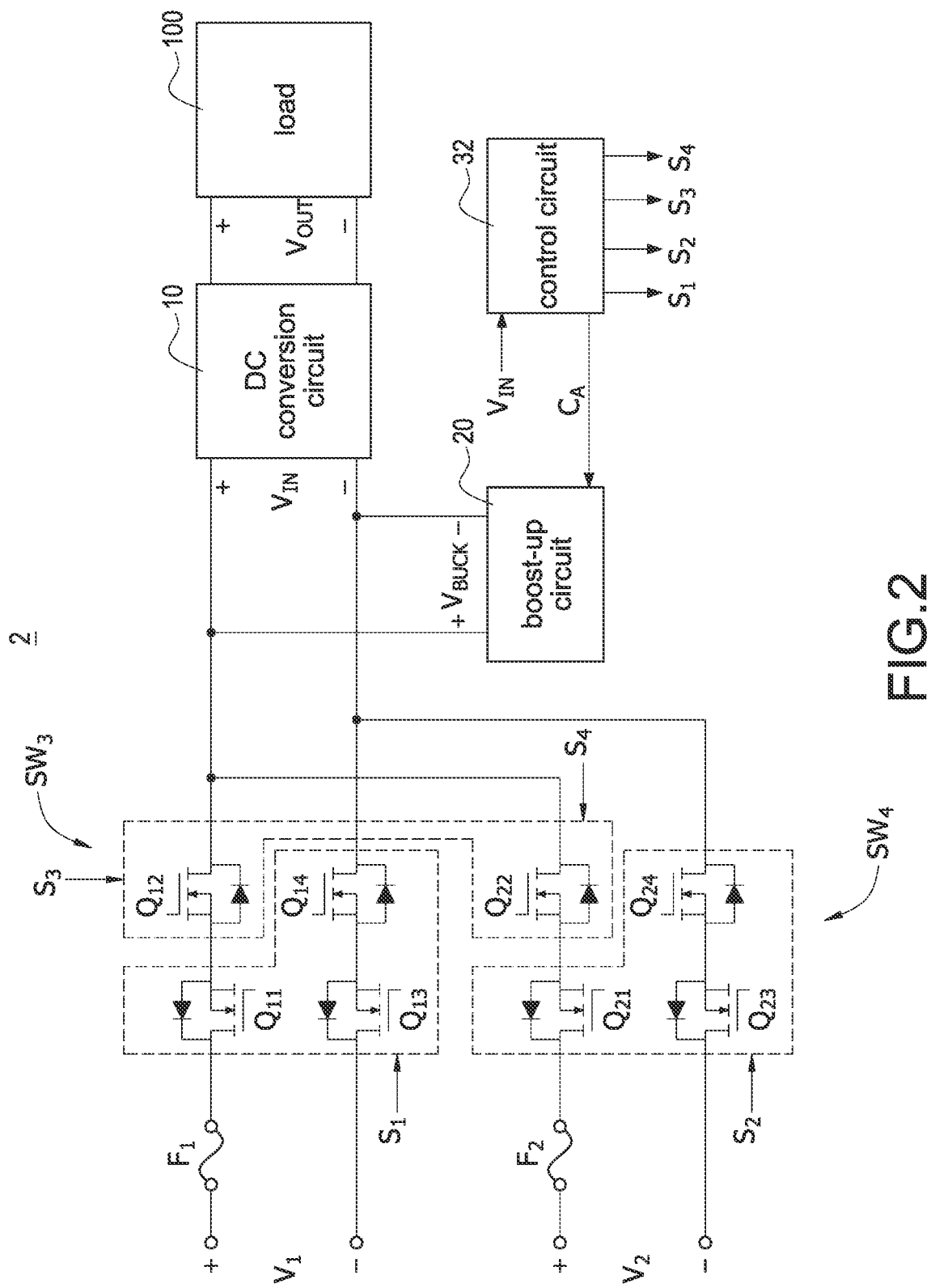
FIG. 2 is a block diagram of a dual-input power switching system according to a second embodiment of the present disclosure.

Please refer to FIG. 2, which shows a block diagram of the dual-input power switching system 2 according to a second embodiment of the present disclosure. In FIG. 1 and FIG. 2, elements with the same function are denoted by the same reference numerals, but are not intended to limit the present disclosure. As shown in FIG. 2, the dual-input power switching system 2 includes a first DC power source $V_{DC1}$ (not shown in FIG. 2, please refer to FIG. 1), a second DC power source $V_{DC2}$ (not shown in FIG. 2, please refer to FIG. 1), a first switch $SW_3$, a second switch $SW_4$, a DC conversion circuit 10, a boost-up circuit 20, and a control circuit 32.

In one embodiment, the dual-input power switching systems 1, 2 further include a first input protection circuit $F_1$ and a second input protection circuit $F_2$. The first input protection circuit $F_1$ is coupled in series to a positive path between the first DC power source $V_{DC1}$ and the first switch $SW_3$. The second input protection circuit $F_2$ is coupled in series to a positive path between the second DC power source $V_{DC2}$ and the second switch $SW_4$. In particular, the input protection circuits $F_1$, $F_2$ may be various types of fuses, such as current fuses, voltage fuses, thermal fuses, and the like.

In one embodiment, the dual-input power switching systems 1, 2 further include an EMI filter (not shown in FIG. 1 and FIG. 2), which may be built in the DC conversion circuit 10 or coupled in parallel to the input side of the DC conversion circuit 10 for filtering the input voltage $V_{IN}$.

The first switch $SW_3$ includes a first power transistor $Q_{11}$, a second power transistor $Q_{12}$, a third power transistor $Q_{13}$, and a fourth power transistor $Q_{14}$. The first power transistor $Q_{11}$ and the second power transistor $Q_{12}$ are connected back to back to form a first switch group with bidirectional condition, and the first switch group is coupled to a positive path between the first DC power source $V_{DC1}$ and the DC conversion circuit 10. The third power transistor $Q_{13}$ and the fourth power transistor $Q_{14}$ are connected back to back to form a second switch group with bidirectional condition, and the second switch group is coupled to a negative path between the first DC power source $V_{DC1}$ and the DC conversion circuit 10.

Similarly, the second switch $SW_4$ includes a fifth power transistor $Q_{21}$, a sixth power transistor $Q_{22}$, a seventh power transistor $Q_{23}$, and an eighth power transistor $Q_{24}$. The fifth power transistor $Q_{21}$ and the sixth power transistor $Q_{22}$ are connected back to back to form a third switch group with bidirectional condition, and the third switch group is coupled to a positive path between the second DC power source $V_{DC2}$ and the DC conversion circuit 10. The seventh power transistor $Q_{23}$ and the eighth power transistor $Q_{24}$ are connected back to back to form a fourth switch group with bidirectional condition, and the fourth switch group is coupled to a negative path between the second DC power source $V_{DC2}$ and the DC conversion circuit 10. In the second embodiment, the power transistors $Q_{11}$, $Q_{12}$, $Q_{13}$, $Q_{14}$, $Q_{21}$, $Q_{22}$, $Q_{23}$, $Q_{24}$ are N-channel enhancement type power MOSFETs. However, the N-channel transistor may be replaced with a P-channel transistor and the control signal level is appropriately modified, but not limited to this.

The control circuit 32 is coupled to the first switch $SW_3$, the second switch $SW_4$, the DC conversion circuit 10, and the boost-up circuit 20, and generates a first control signal $S_1$ and a third control signal $S_3$ to the first switch $SW_3$, generates a second control signal $S_2$ and a fourth control signal $S_4$ to the second switch $SW_4$, and generates a boost-up signal $C_A$ to the boost-up circuit 20 according to the input voltage $V_{IN}$ of the DC conversion circuit 10. In the embodiments of FIG. 1 and FIG. 2, the control circuits 30, 32 may be any type of control circuit, such as, but not limited to, digital or analog microcontrollers, microprocessors, general-purpose integrated circuits (GPIC), or application-specific integrated circuits (ASIC).

In operation, when the control circuit 32 detects that the first DC power source $V_{DC1}$ provides the first DC voltage $V_1$ being the input voltage $V_{IN}$, the control circuit 32 turns on the first power transistor $Q_{11}$, a third power transistor $Q_{13}$, and the fourth power transistor $Q_{14}$ of the first switch $SW_3$ by the first control signal $S_1$, and turns on the second power transistor $Q_{12}$ of the first switch $SW_3$ by the third control signal $S_3$. When the control circuit 32 detects that the first DC power source $V_{DC1}$ stops supplying power to lead to power drop of the input voltage $V_{IN}$, the control circuit 32 activates the boost-up circuit 20 by the boost-up signal $C_A$. The boost-up circuit 20 increases the hold-up voltage $V_{BUCK}$ according to the boost-up signal $C_A$, and provides the hold-up voltage $V_{BUCK}$ to the DC conversion circuit 10 to boost up the input voltage $V_{IN}$.

When the input voltage $V_{IN}$ starts to be boosted up, the control circuit 32 turns off the second power transistor $Q_{12}$ by the third control signal $S_3$. Until the hold-up voltage $V_{BUCK}$ has reached to the specific voltage that is greater than the second DC voltage $V_2$, the control circuit 32 deactivates the boost-up circuit 20 by the boost-up signal $C_A$, and turns off the first power transistor $Q_{11}$, the third power transistor $Q_{13}$, and the fourth power transistor $Q_{14}$ of the first switch $SW_3$ by the first control signal $S_1$. Until the hold-up voltage of the input voltage $V_{IN}$ has been maintained for a specific time period, the control circuit 32 turns on the fifth power transistor $Q_{21}$, the seventh power transistor $Q_{23}$, and the eighth power transistor $Q_{24}$ of the second switch $SW_4$ by the second control signal $S_2$, such that the second DC power source $V_{DC2}$ is prepared to provide the second DC voltage $V_2$. Until the input voltage $V_{IN}$ has naturally decreased to be less than or equal to the second DC voltage $V_2$, the control circuit 32 turns on the sixth power transistor $Q_{22}$ of the second switch $SW_4$ by the fourth control signal $S_4$, such that the second DC power source $V_{DC2}$ provides the second DC voltage $V_2$ being the input voltage $V_{IN}$. Alternatively, a body diode of the sixth power transistor $Q_{22}$ is naturally forward turned on, such that the second DC power source $V_{DC2}$ provides the second DC voltage $V_2$ being the input voltage $V_{IN}$.

As a result, when the first DC power source $V_{DC1}$ stops supplying power to lead to power drop of the input voltage $V_{IN}$, the boost-up circuit 20 provides the hold-up voltage $V_{BUCK}$ to boost up the input voltage $V_{IN}$ to keep the load 100 working. Meanwhile, the boost-up circuit makes the hold-up voltage $V_{BUCK}$ to reach to the specific voltage greater than the second DC voltage $V_2$ and afterward naturally decreases to be less than or equal to the second DC voltage $V_2$, which can avoid inrush current generated by the voltage difference between the first DC voltage $V_1$ and the second DC voltage $V_2$, thereby protecting the dual-input power switching system 2.

Figure 3:
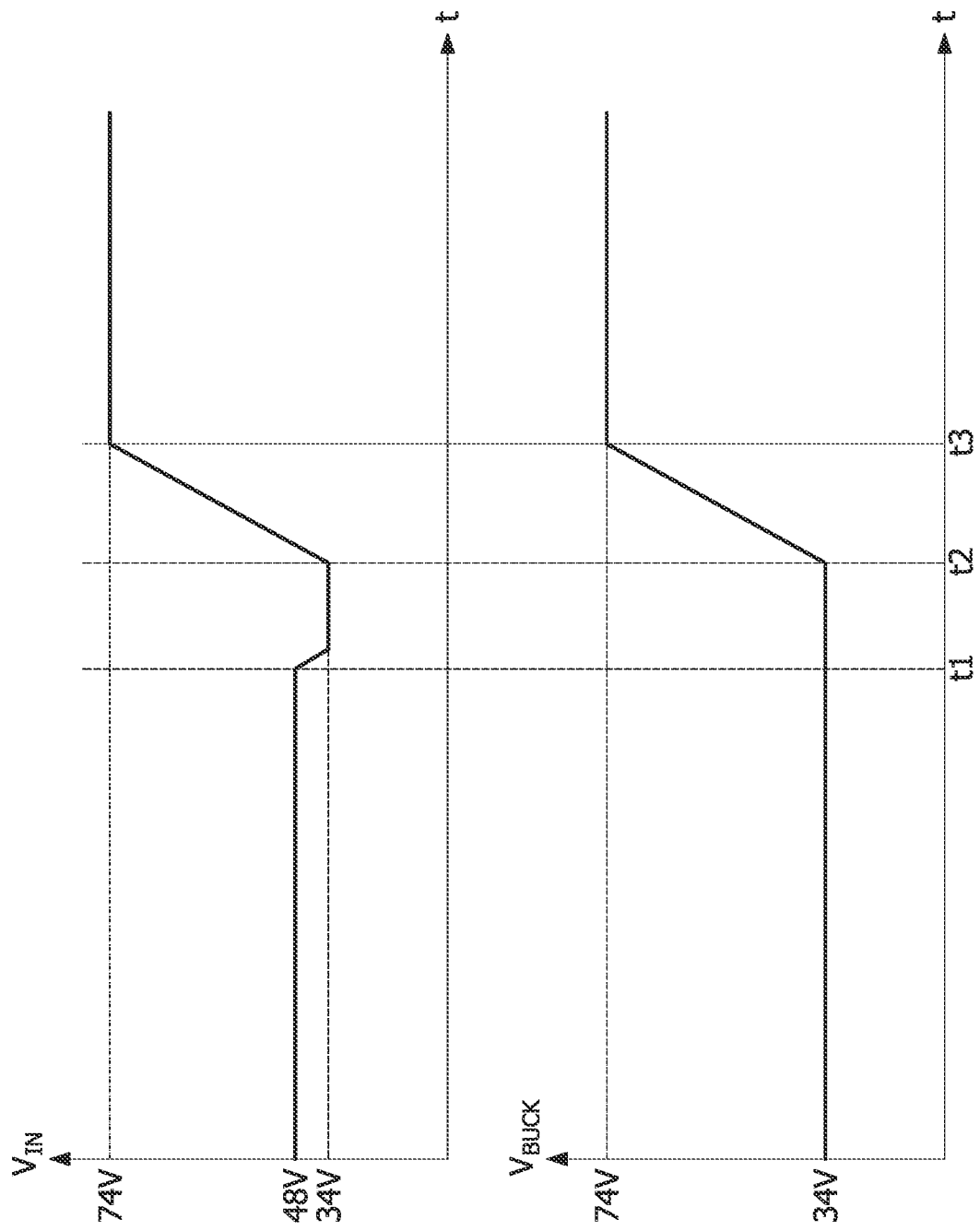
FIG. 3 is a schematic waveform of activating a boost-up circuit of the dual-input power switching system according to the present disclosure.

Please refer to FIG. 3, which shows a schematic waveform of activating a boost-up circuit of the dual-input power switching system according to the present disclosure, in conjunction with FIG. 1 and FIG. 2. Before time t1, the first DC power source $V_{DC1}$ provides the first DC voltage $V_1$ (for example, 48 volts), and the first switches $SW_1$ and $SW_3$ are turned on to transmit the first DC voltage $V_1$ to the DC conversion circuit 10 to be the input voltage $V_{IN}$. Between times t1 and t2, the first DC power source $V_{DC1}$ stops supplying power to lead to power drop of the input voltage $V_{IN}$ to a minimum operating voltage (for example, 34 volts)

of the dual-input power switching system 1, 2, and thus the boost-up circuit 20 is activated. Between times t2 and t3, the boost-up circuit 20 provides the hold-up voltage $V_{BUCK}$ to boost up the input voltage $V_{IN}$ to the specific voltage (for example, 74 volts) that is greater than the second DC voltage $V_2$ (for example, 68 volts).

Figure 4:
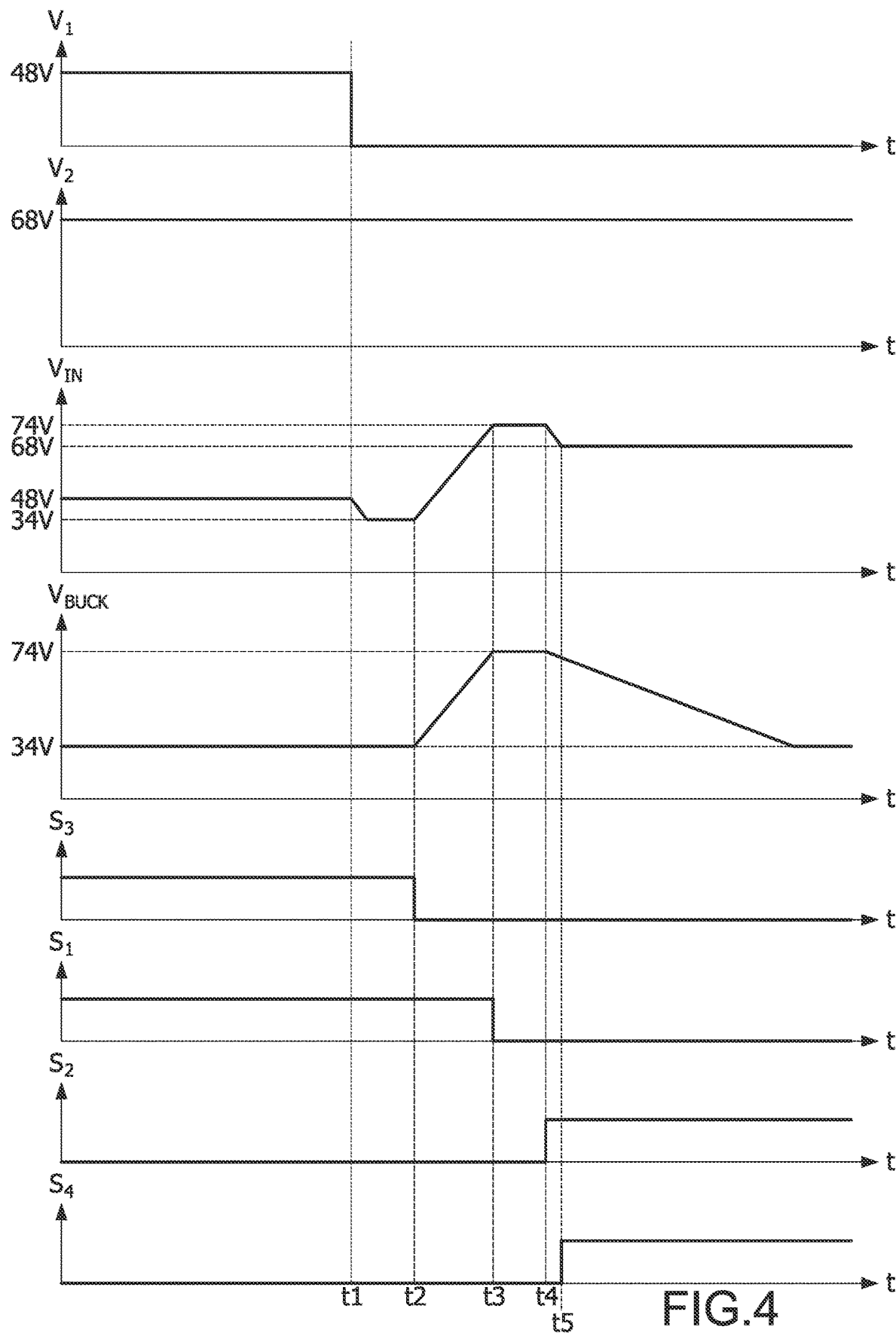
FIG. 4 is a schematic waveform of switching the dual-input power switching system according to the present disclosure.

Please refer to FIG. 4, which shows a schematic waveform of switching the dual-input power switching system according to the present disclosure, in conjunction with FIG. 2. The first control signal $S_1$ controls the first power transistor $Q_{11}$, the third power transistor $Q_{13}$, and the fourth power transistor $Q_{14}$ of the first switch $SW_1$; the second control signal $S_2$ controls the fifth power transistor $Q_{21}$, the seventh power transistor $Q_{23}$, and the eighth power transistor $Q_{24}$ of the second switch $SW_2$; the third control signal $S_3$ controls the second power transistor $Q_{12}$ of the first switch $SW_1$; and the fourth control signal $S_4$ controls the sixth power transistor $Q_{22}$ of the second switch $SW_2$.

Before time t1, the third control signal $S_3$ is at a high level to turn on the second power transistor $Q_{12}$ of the first switch $SW_3$, and the first control signal $S_1$ is at a high level to turn on the first power transistor $Q_{11}$, the third power transistor $Q_{13}$, and the fourth power transistor $Q_{14}$ of the first switch $SW_3$, such that the first DC power source $V_{DC1}$ provides the first DC voltage $V_1$ (for example, 48 volts) to the DC conversion circuit 10 to be the input voltage $V_{IN}$. In this condition, the second control signal $S_2$ is at a low level to turn off the fifth power transistor $Q_{21}$, the seventh power transistor $Q_{23}$, and the eighth power transistor $Q_{24}$ of the second switch $SW_4$, and the second DC power source $V_{DC2}$ is in a standby state. It is assumed that the first DC power source $V_{DC1}$ stops supplying power at time t1 (as shown in FIG. 4, the first DC voltage $V_1$ drops from 48 volts to 0 volt), this moment the input voltage $V_{IN}$ provided to the DC conversion circuit 10 gradually decreases (for example, decreases to 34 volts).

At time t2, the boost-up circuit 20 is activated, and the third control signal $S_3$ is at a low level to turn off the second power transistor $Q_{12}$ of the first switch $SW_1$ to avoid the current generated by the voltage difference between the hold-up voltage $V_{BUCK}$ provided by the boost-up circuit 20 and the first DC voltage $V_1$ (0 volt) from flowing into the first DC power source $V_{DC1}$. When the boost-up circuit 20 is activated from time t2 to time t3, the boost-up circuit 20 gradually increases the hold-up voltage $V_{BUCK}$ to the specific voltage. In one embodiment, the hold-up voltage $V_{BUCK}$ is generated by an auxiliary power source, which can be provided by an energy storage element (for example, but not limited to a capacitor, a super capacitor, etc.), and configured to provide the output voltage having a normal output level within a hold-up time when the power supply is shut down or powered off, thereby providing stable power supply. Therefore, when the boost-up circuit 20 is activated, the boost-up circuit 20 is configured to gradually increase the voltage (i.e., the hold-up voltage $V_{BUCK}$) being the auxiliary power source. In this condition, both the first DC power source $V_{DC1}$ and the second DC power source $V_{DC2}$ do not supply power, and the hold-up voltage $V_{BUCK}$ provided by the auxiliary power source temporarily supplies power to the load 100.

When the hold-up voltage $V_{BUCK}$ increases to the specific voltage, in this embodiment, the specific voltage is 74 volts greater than the second DC voltage $V_2$ of 68 volts, which means that at time t3, the hold-up voltage $V_{BUCK}$ increases to 74 volts, and the first control signal $S_1$ is at a low level to turn off the first power transistor $Q_{11}$, the third power transistor $Q_{13}$, and the fourth power transistor $Q_{14}$ of the first switch $SW_3$ to turn off (disconnect) a power supply path of the first DC power source $V_{DC1}$. Until the specific voltage has been maintained for the specific time period from time t3 to time t4, the second control signal $S_2$ is at a high level to turn on the fifth power transistor $Q_{21}$, the seventh power transistor $Q_{23}$, and the eighth power transistor $Q_{24}$ of the second switch $SW_4$, such that the second DC power source $V_{DC2}$ is prepared to provide the second DC voltage $V_2$. Until the input voltage $V_{IN}$ has naturally dropped to be less than or equal to the second DC voltage $V_2$ from time t4 to time t5, the control circuit 32 turns on the sixth power transistor $Q_{22}$ of the second switch $SW_4$ through the fourth control signal $S_4$, such that the second DC power source $V_{DC2}$ provides the second DC voltage $V_2$ being the input voltage $V_{IN}$.

At time t4, the input voltage $V_{IN}$ is boosted up to the specific voltage (74 volts) greater than the second DC voltage $V_2$ (68 volts) by the hold-up voltage $V_{BUCK}$, and the boost-up circuit 20 is deactivated, and thus the input voltage $V_{IN}$ will naturally drop from 74 volts to 68 volts. As a result, the input voltage $V_{IN}$ naturally drops from a higher specific voltage to a lower second DC voltage $V_2$, and no inrush current is generated during the natural drop of the input voltage $V_{IN}$, thus avoiding inrush current generated by the voltage difference between the first DC voltage $V_1$ and the second DC voltage $V_2$, thereby protecting the dual-input power switching system 2.

In one embodiment, the specific voltage is a maximum operating voltage of the dual-input power switching system 1, 2. It should be noted that the maximum operating voltage of the dual-input power switching systems 1, 2 should be greater than the first DC voltage $V_1$ provided by the first DC power source $V_{DC1}$ and the second DC voltage $V_2$ provided by the second DC power source $V_{DC2}$ to ensure that the voltage received from the DC power source does not exceed the safety operating range.

In one embodiment, the specific voltage is a voltage greater than the second DC voltage $V_2$. For example, when the first DC voltage $V_1$ is 68 volts and the second DC voltage $V_2$ is 48 volts, since the first DC voltage $V_1$ has been dropped to zero volt at time t1, the boost-up circuit 20 only needs to boost up the hold-up voltage $V_{BUCK}$ to the specific voltage (for example, 54 volts) greater than the second DC voltage $V_2$ (48 volts) at time t3, and the inrush current can be avoided just right.

After time t4, the boost-up circuit 20 no longer boosts up the hold-up voltage $V_{BUCK}$ to boost up the input voltage $V_{IN}$. When the input voltage $V_{IN}$ naturally drops to be less than the second DC voltage $V_2$, a body diode of the sixth power transistor $Q_{22}$ of the second switch $SW_4$ will be naturally forward turned on. Since the boost-up circuit 20 has been deactivated, the hold-up voltage $V_{BUCK}$ is no longer boosted up, and therefore the hold-up voltage $V_{BUCK}$ will gradually decrease to the minimum operating voltage (for example, 34 volts) of the dual-input power switching system 2. Therefore, in one embodiment, at time t5, the sixth power transistor $Q_{22}$ may not be turned on by the fourth control signal $S_4$; alternatively, the sixth power transistor $Q_{22}$ may be replaced by a diode. In one embodiment, turning on the sixth power transistor $Q_{22}$ by the fourth control signal $S_4$ at time t5 can reduce an on-resistance and an on-voltage of the sixth power transistor $Q_{22}$ to speed up the power supply of the second DC voltage $V_2$.

As a result, through the power switching operation of the dual-input power switching system 2 shown in FIG. 4, the inrush current generated by the voltage difference between the dual DC power sources can be avoided, thereby protecting the dual-input power switching system 2.

Figure 5:
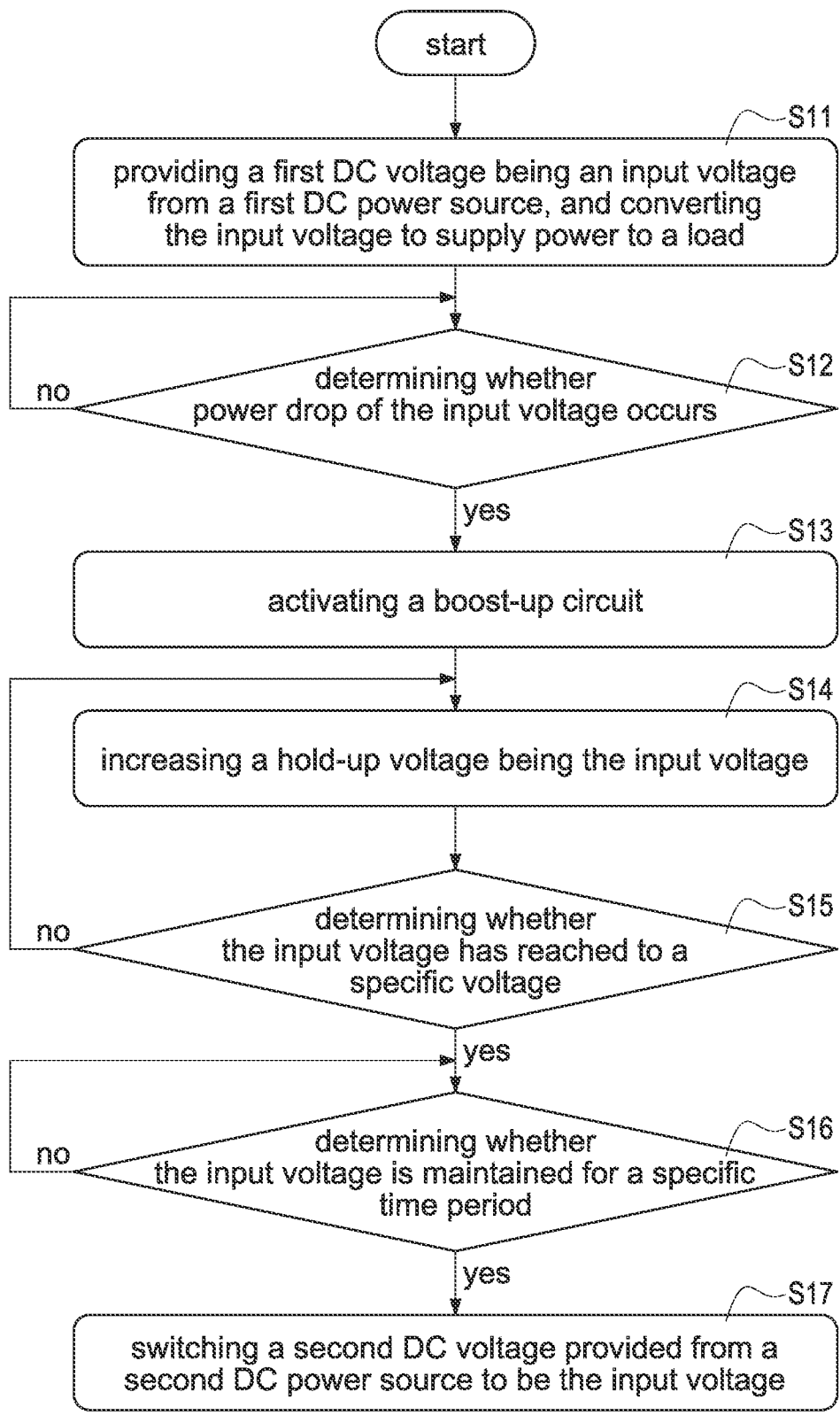
FIG. 5 is a flowchart of a method of operating the dual-input power switching system according to the present disclosure.

Please refer to FIG. 5, which shows a flowchart of a method of operating the dual-input power switching systems 1, 2 according to the present disclosure, in conjunction with FIG. 1 to FIG. 4. The method is used to operate the dual-input power switching systems 1, 2, wherein the specific description of the dual-input power switching systems 1, 2 can be found in the foregoing disclosure (see FIG. 1 to FIG. 4, and their corresponding descriptions), and the detail description is omitted here for conciseness.

The method of operating the dual-input power switching system includes steps of: first, providing a first DC voltage $V_1$ being an input voltage $V_{IN}$ from a first DC power source $V_{DC1}$, and converting the input voltage $V_{IN}$ to supply power to a load 100 ($S_{11}$). Afterward, determining whether power drop of the input voltage $V_{IN}$ occurs ($S_{12}$). When the power drop of the input voltage $V_{IN}$ does not occur, the first DC power source $V_{DC1}$ continuously supplies power to the load 100 (return to $S_{11}$).

Afterward, determining that the first DC power source $V_{DC1}$ stops supplying power, and activating a boost-up circuit 20 ($S_{13}$) when the power drop of the input voltage $V_{IN}$ occurs, to gradually increase a hold-up voltage $V_{BUCK}$ being the input voltage $V_{IN}$ ($S_{14}$). In one embodiment, the hold-up voltage $V_{BUCK}$ is generated by an auxiliary power source, which can be provided by an energy storage element (for example, but not limited to a capacitor, a super capacitor, etc.) configured to provide the output voltage having a normal output level within a hold-up time when the power supply is shut down or powered off, thereby providing stable power supply.

Afterward, determining whether the input voltage $V_{IN}$ has reached to a specific voltage ($S_{15}$). When the hold-up voltage $V_{BUCK}$ has not reached to the specific voltage, the boost-up circuit 20 is continuously activated to increase the input voltage $V_{IN}$ being the input voltage $V_{IN}$. Afterward, determining whether the input voltage $V_{IN}$ is maintained for a specific time period until the input voltage $V_{IN}$ has reached to the specific voltage ($S_{16}$). If the input voltage $V_{IN}$ has not been maintained for the specific time period, the determination of step $S_{16}$ is continuously performed. Afterward, switching a second DC voltage $V_2$ provided from a second DC power source $V_{DC2}$ to be the input voltage $V_{IN}$ until the input voltage $V_{IN}$ has reached to the specific voltage and maintains for the specific time period ($S_{17}$).

To sum up, the present disclosure has the following features and advantages: when the first DC power source $V_{DC1}$ stops supplying power to lead to power drop of the input voltage $V_{IN}$, the boost-up circuit 20 is activated to provide the hold-up voltage $V_{BUCK}$ to boost up the input voltage $V_{IN}$ so as to keep the load 100 working under the power drop of the input voltage $V_{IN}$. Moreover, the boost-up circuit 20 makes the hold-up voltage $V_{BUCK}$ to reach to the specific voltage greater than the second DC voltage $V_2$, which can avoid inrush current generated by the voltage difference between the first DC voltage $V_1$ and the second DC voltage $V_2$, thereby protecting the dual-input power switching systems 1, 2. Meanwhile, after the boost-up circuit is deactivated, the input voltage $V_{IN}$ naturally drops from the higher specific voltage to the lower second DC voltage $V_2$, and no inrush current is generated during the natural drop of the input voltage $V_{IN}$.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A dual-input power switching system, comprising:
    a first DC power source, configured to provide a first DC voltage,
    a second DC power source, configured to provide a second DC voltage,
    a DC conversion circuit, connected to an output side of the second DC power source and an output side of the first DC power source, configured to receive the first DC voltage or the second DC voltage being an input voltage, and convert the input voltage to supply power to a load,
    a boost-up circuit, coupled to an input side of the DC conversion circuit, the output side of the first DC power source, and the output side of the second DC power source,
    a first switch and a second switch, and
    a control circuit coupled to the first switch, the second switch and the boost-up circuit, and configured to generate a first control signal to the first switch, a second control signal to the second switch, and a boost-up signal to the boost-up circuit,
    wherein the control circuit is configured to control the boost-up circuit by the boost-up signal to provide a hold-up voltage to boost up the input voltage when the first DC power source stops supplying power to lead to power drop of the input voltage,
    wherein the control circuit is configured to deactivate the boost-up circuit by the boost-up signal, and turns off the first switch by the first control signal when the input voltage reaches to a specific voltage that is greater than the second DC voltage,
    wherein the control circuit is configured to turn on the second switch by the second control signal so that the second DC voltage is provided to the DC conversion circuit being the input voltage when the input voltage naturally decreases to be less than or equal to the second DC voltage.

2. The dual-input power switching system as claimed in claim 1, wherein
    the first switch is coupled between the output side of the first DC power source and the input side of the DC conversion circuit, wherein when the first switch is turned on, the first DC voltage is provided to the DC conversion circuit being the input voltage, and
    the second switch is coupled between the output side of the second DC power source and the input side of the DC conversion circuit, wherein when the second switch is turned on, the second DC voltage is provided to the DC conversion circuit being the input voltage.

3. The dual-input power switching system as claimed in claim 2, wherein
    when the control circuit detects that the first DC power source provides the first DC voltage being the input voltage, the control circuit turns on the first switch by the first control signal, or when the control circuit detects that the second DC power source provides the second DC voltage being the input voltage, the control circuit turns on the second switch by the second control signal.

4. The dual-input power switching system as claimed in claim 3, wherein when the control circuit detects that the first DC power source stops supplying power to lead to power drop of the input voltage, the control circuit activates the boost-up circuit by the boost-up signal, such that boost-up circuit provides the hold-up voltage to the DC conversion circuit to boost up the input voltage, until the hold-up voltage reaches to the specific voltage that is greater than the second DC voltage, the control circuit deactivates the boost-up circuit by the boost-up signal and turns off the first switch by the first control signal, and until the hold-up voltage is maintained for a specific time period, the control circuit turns on the second switch by the second control signal, such that the second DC power source provides the second DC voltage being the input voltage.

5. The dual-input power switching system as claimed in claim 2, wherein the first switch comprises a first power transistor, a second power transistor, a third power transistor, and a fourth power transistor, wherein the first power transistor and the second power transistor are connected back to back to form a first switch group with bidirectional condition, and the first switch group is coupled to a positive path between the first DC power source and the DC conversion circuit, and the third power transistor and the fourth power transistor are connected back to back to form a second switch group with bidirectional condition, and the second switch group is coupled to a negative path between the first DC power source and the DC conversion circuit.

6. The dual-input power switching system as claimed in claim 5, wherein the second switch comprises a fifth power transistor, a sixth power transistor, a seventh power transistor, and an eighth power transistor, wherein the fifth power transistor and the sixth power transistor are connected back to back to form a third switch group with bidirectional condition, and the third switch group is coupled to a positive path between the second DC power source and the DC conversion circuit, and the sixth power transistor is coupled to the second power transistor, and the seventh power transistor and the eighth power transistor are connected back to back to form a fourth switch group with bidirectional condition, and the fourth switch group is coupled to a negative path between the second DC power source and the DC conversion circuit, and the eighth power transistor is coupled to the fourth power transistor.

7. The dual-input power switching system as claimed in claim 6, wherein when the control circuit detects that the first DC power source provides the first DC voltage being the input voltage, the control circuit turns on the first power transistor, the third power transistor, and the fourth power transistor by the first control signal, and turns on the second power transistor by the third control signal, and when the control circuit detects that the first DC power source stops supplying power to lead to power drop of the input voltage, the control circuit activates the boost-up circuit by the boost-up signal, such that boost-up circuit provides the hold-up voltage to the DC conversion circuit to boost up the input voltage.

8. The dual-input power switching system as claimed in claim 7, wherein when the input voltage starts to be boosted up, the control circuit turns off the second power transistor by the third control signal, until the hold-up voltage reaches to the specific voltage that is greater than the second DC voltage, the control circuit deactivates the boost-up circuit by the boost-up signal, and turns off the first power transistor, the third power transistor, and the fourth power transistor by the first control signal, and until the hold-up voltage is maintained for a specific time period, the control circuit turns on the fifth power transistor, the seventh power transistor, and the eighth power transistor by the second control signal, such that the second DC power source is prepared to provide the second DC voltage.

9. The dual-input power switching system as claimed in claim 8, wherein until the input voltage naturally decreases to be less than or equal to the second DC voltage, the control circuit turns on the sixth power transistor by the fourth control signal, such that the second DC power source provides the second DC voltage being the input voltage.

10. The dual-input power switching system as claimed in claim 8, wherein until the input voltage naturally decreases to be less than or equal to the second DC voltage, a body diode of the sixth power transistor is naturally forward turned on, such that the second DC power source provides the second DC voltage being the input voltage.

11. The dual-input power switching system as claimed in claim 1, wherein the specific voltage is a maximum operating voltage of the dual-input power switching system, and the maximum operating voltage is greater than the first DC voltage and the second DC voltage.

12. The dual-input power switching system as claimed in claim 1, wherein when the first DC power source stops supplying power to lead to power drop of the input voltage to a minimum operating voltage of the dual-input power switching system, the boost-up circuit is activated.

13. The dual-input power switching system as claimed in claim 12, wherein when the boost-up circuit is deactivated, the hold-up voltage is the maximum operating voltage of the dual-input power switching system.

14. A method of operating a dual-input power switching system, the dual-input power switching system comprising a DC conversion circuit, a boost-up circuit, and a first switch and a second switch, wherein the DC conversion circuit is connected to an output side of a first DC power source and an output side of a second DC power source; the boost-up circuit is coupled to an input side of the DC conversion circuit, the output side of the first DC power source, and the output side of the second DC power source; the first switch and the second switch are respectively connected between the first DC power source, the second DC power source and the DC conversion circuit, comprising steps of:

(a) providing a first DC voltage being an input voltage from the first DC power source, and converting the input voltage to supply power to a load, (b) determining whether power drop of the input voltage occurs, (c) activating the boost-up circuit when the power drop of the input voltage occurs to gradually increase a hold-up voltage being the input voltage, (d) deactivating the boost-up circuit when the input voltage reaches to a specific voltage that is greater than a second DC voltage provided from the second DC power source, and (e) switching the second DC voltage to be the input voltage when the input voltage naturally decreases to be less than or equal to the second DC voltage.

15. The method as claimed in claim 14, further comprising steps of:

using the first DC voltage provided from the first DC power source to be the input voltage when the power drop of the input voltage does not occur, and continuously activating the boost-up circuit to increase the hold-up voltage being the input voltage when the input voltage has not reached to the specific voltage.

16. The method as claimed in claim 14, wherein the step (c) comprises a step of:

activating the boost-up circuit when the first DC power source stops supplying power to lead to power drop of the input voltage to a minimum operating voltage of the dual-input power switching system.

17. The method as claimed in claim 14, wherein the step (d) comprises a step of:

deactivating the boost-up circuit when the input voltage has reached to the specific voltage and maintains for a specific time period.

18. The method as claimed in claim 17, wherein after the boost-up circuit is deactivated, the hold-up voltage naturally drops to a minimum operating voltage of the dual-input power switching system.

19. The method as claimed in claim 14, wherein the specific voltage is a maximum operating voltage of the dual-input power switching system, and the maximum operating voltage is greater than the first DC voltage and the second DC voltage.

* * * * *